United States Patent [19]
Coviello, Jr.

[11] Patent Number: 5,848,522
[45] Date of Patent: Dec. 15, 1998

[54] VEGETABLE AND FRUIT SAVER

[75] Inventor: Andrew Gary Coviello, Jr., Greenwich, Conn.

[73] Assignee: Andrew G. Coviello, Sr., Greenwich, Conn.

[21] Appl. No.: 808,726

[22] Filed: Feb. 28, 1997

[51] Int. Cl.⁶ ................................................. A01D 75/00
[52] U.S. Cl. ............................. 56/329; 56/340.1; 47/25
[58] Field of Search ................... 56/329, 328.1, 56/330, 331, 340.1; 47/25

[56] References Cited

U.S. PATENT DOCUMENTS

| | | | |
|---|---|---|---|
| 948,579 | 2/1910 | Nickell | 56/329 |
| 1,111,597 | 9/1914 | Littleton | 56/329 |
| 1,366,563 | 1/1921 | Fleckner | 56/329 |
| 1,494,149 | 5/1924 | Cabala | 56/329 |
| 1,515,551 | 11/1924 | Christo | 56/329 |
| 2,519,678 | 8/1950 | MacKenzie | 56/329 |

*Primary Examiner*—Terry Lee Melius
*Attorney, Agent, or Firm*—Richard T. Holzmann

[57] ABSTRACT

A product and method for increasing the yield of quality fruits and vegetables by gathering fallen produce above the ground in a simply constructed enclosure thereby reducing the incidence of spoilage. A plurality of arms having holes therein and hooks, a stake and a step as parts thereof, said stakes being forced into the earth surrounding the plant by stepping on said step. A net is hooked onto the arms in an imaginary frustoconical shape so that fallen fruit can be held in place where fallen and can be urged to the stem of the plant where a shield encircling the plant surrounds the stem for collecting the fallen produce. Tying means threaded into the holes of the arms encircles the net to provide support therefor and to ensure that all fallen fruit is gathered on the shield for subsequent collection. A method for the assembly of the fruit and vegetable saver is presented.

12 Claims, 5 Drawing Sheets

VEGETABLE AND FRUIT SAVER

This invention has been disclosed in Disclosure Document No. 405234 dated Sep. 4, 1996.

FIELD OF THE INVENTION

The present invention relates in general to a vegetable and fruit catcher which prevents the produce from falling to the ground from the plant and rotting and, more particularly, to a structural improvement of such a catcher.

BACKGROUND OF THE INVENTION

There are a variety of conventional receptacles for gathering fruit fallen from a tree. However, these systems are overly complex in construction and use and, therefore, relatively expensive in time and money to procure, install and operate. Consequently, they do not lend themselves to use by the home gardener or small commercial grower.

Seventy-five years ago Totten taught in U.S. Pat. No. 1,536,167 of a circular apron adapted to encircle the trunk of a tree and adjustable vertically of the trunk for deflecting fruit into a heap at the foot of the tree or outwardly therefrom. U.S. Pat. No. 2,436,173 disclosed a fruit gatherer having a ground-engaging flat sheet metal pan consisting of two semi-circular halves hinged together with arcuate side walls tapering down to a flat bottom, covered on the inside and bottom with canvas to soften the fall of the fruit.

U.S. Pat. No. 2,519,678 teaches of a fruit gatherer of semi-circular conical fabric net sections preferably of canvas, and having a complex conical deflector for guiding fruit into discharge openings where the fruit can be simultaneously passed into shipping boxes or crates placed under the net. The most complex apron by far is disclosed in U.S. Pat. No. 2,649,680 which comprises the apron and an inflatable member around its inner and outer rims which member gives the apron a resilient, shock-absorbing yet stiffened surface for reducing the degree of bruising as the fruit falls. Further embodiments include a vibrator for shaking the tree and apron, and inflatable leg portions.

Finally, the prior art in U.S. Pat. No. 3,490,216 discloses a ground-engaging receptacle comprising a frame with walls of arcuate segments having a net of flexible plastic sheet material secured to the top edge of said frame and a substantial portion thereof coplanar with said wall bottom edge thereby enabling a fruit picker to stand thereon.

These prior art inventions were designed for use with sizable commercial orchards where sufficient capital investment and labor are available to gather the fruit. Most of them have relatively large numbers of elements adding to their complexity in use and manufacture. The so-called nets are really aprons with, perhaps, a few holes therein to allow water drainage. In some instances there are stakes supporting stakes and ropes supporting ropes. In others one requires inflatable tubes, vibrators and heavy metal pans. These devices would be unsuitable for small orchards due to their cost and complexity, and for home gardens due to their size. It is this problem of adaptability to the small orchard and vegetable garden that prompted the development of the instant invention.

The problem of the bruising, spoiling and putrefaction of fruit and vegetables having fallen to the ground before harvesting for the small producer and even the home gardener is the problem solved by the instant invention. This is especially useful in the hundreds of thousands of home gardens raising tomatoes, for example, in the United States.

Thus, the purpose of this invention is the utilization of a very few elements of simple construction, and to thereby produce the effect of a major reduction in the quantity of wastage of produce.

SUMMARY OF THE INVENTION

According to the teaching of the present invention, as characterized in products manufactured thereby, a fruit and vegetable saver for harvesting with reduced spoilage by preventing produce of a plant from falling to the ground comprising a plurality of spaced apart supporting arms having holes therein and hooks and a stake as parts thereof; a net for catching falling fruits and vegetables attached to said hooks of said supporting arms providing an inverted frustoconical shape (an inverted truncated cone) when placed in position around a plant; a tying means for insertion into said holes of said supporting arms for maintaining the frustoconical shape of said net; and a shield means for insertion about said plant at an imaginary frustoconical plane of said frustoconical shape for preventing said fruit and vegetable from discharging from said saver.

The saver further comprising a step as part of said arm for applying a force to drive said arm into the ground, said step being at an angle to said arm and said stake to allow catching of all falling produce. Said arms are of high strength plastic to resist corrosion and weathering. Said net having sufficient openings to provide drainage and to be of sufficient strength and configuration to hold the produce in place where fallen or to urge the produce to said shield. Said tying means may be a plastic rope. Said shield is of plastic having a circular periphery adequate to be supported by said step of said arm, having a hole in its center to accomodate a stem of said plant, and having a slit from said center hole to said periphery to allow bending of said shield for placement around the stem.

According to one practice of the invention, a method for increasing yield of certain fruit and vegetable plants by reducing the incidence of spoilage comprising the steps of providing an arm-supported netting in an inverted frustoconical shape positioned about said plant; positioning tying means into said arm supports for maintaining said inverted frustoconical shape of said netting; placing a shield means for insertion about said plant at said imaginary frustoconical plane for preventing said fruit and vegetable from discharging from said netting; and harvesting said fruit and vegetables when sufficient quantities have collected on said shield.

These and other features of the invention will be more clearly understood and recognized upon considering the detailed description which follows.

DETAILED DESCRIPTION OF THE PREFERRED EMBODIMENT

The present invention is directed to increase the yield of those fruits and vegetables which have a tendency to fall from the plant onto the ground. Not only is there the damage due to the bruising of the produce caused by striking the ground which accelerates the rate of decay, but additional factors are involved. Soil-borne diseases such as verticillium wilt, nematodes, fusarium wilt, and tobacco mosaic virus are prevalent in many soils which contribute to rapid spoilage and decay. Gathering produce above the ground for easy collection can greatly contribute to improved yield of quality product.

Figure 1:
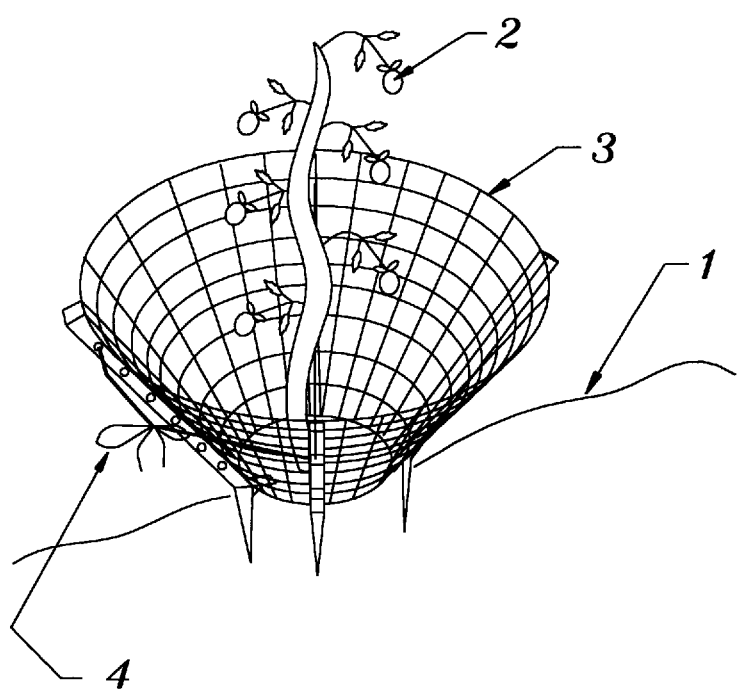
FIG. 1 is a perspective view depicting the fruit and vegetable saver positioned about a plant, in accordance with the present invention.
Figure 3:
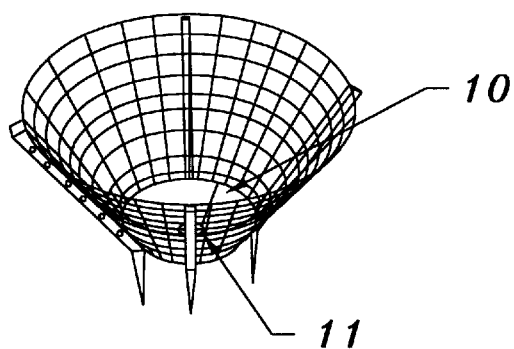
FIG. 3 is a perspective view of the inverted frustoconical shape of the assembled elements, in accordance with the present invention.
Figure 4:
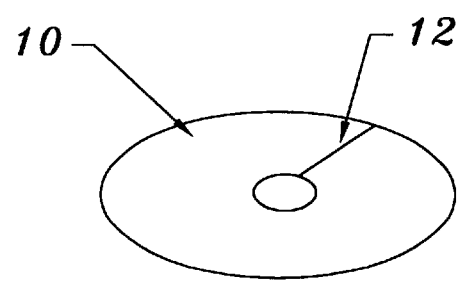
FIG. 4 is a top view of the slitted shield, in accordance with the present invention.

FIG. 1 illustrates the fruit and vegetable saver positioned about a plant, in accordance with the present invention wherein the ground 1 and plant 2 are shown. According to a preferred embodiment of the invention, the net 3 is of a hole size to allow complete drainage of any water which might have a tendency to accumulate, while the net is of sufficient strength to hold the produce in place where fallen or to urge movement of any fallen fruit or vegetable to lie on the shield 10 as shown in FIGS. 3 and 4 without falling through the net.

It is contemplated that in the best mode of this invention all elements are made of durable plastics of sufficient strength suitable for the application in order to keep costs low, and as importantly, to provide long life with respect to avoidance of corrosion and reduction in weatherability. Polyvinyl chloride (PVC) comes to mind as quite suitable for strength of the arms 5 and shield 10, while nylon is more appropriate for the tying means 4 and net 3. It must be emphasized that the primary field of use envisioned for this invention is the home garden and the small commercial orchard. Consequently, since one system is required for each plant there can be quite a considerable number of units required for most potential users. Therefore, low cost, easy storage, low weight and long-life are essential, features not present in the prior art inventions.

While plastics suit this application satisfactorily, certainly metals can, of course, be used but at greater weight, greater cost and shorter life due to the adverse weathering conditions usually present.

Figure 2:
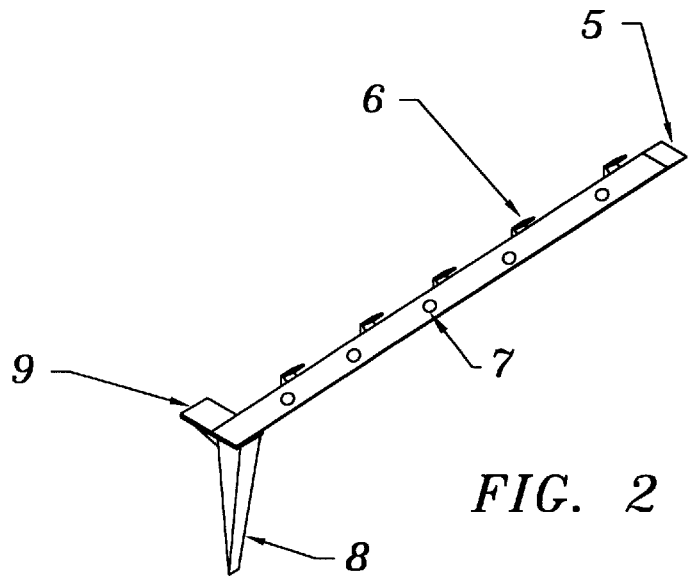
FIG. 2 is a side view of a supporting arm, in accordance with the present invention.

FIG. 2 illustrates by a side view an arm 5 used to support the net 3 as well as the step 9 which is used not only to force the stake 8 into the ground, but also to support the shield 10 used for catching the fallen produce. This arm 5 can be of any length suitable to insure that it can reach outwardly from the stem or trunk far enough to catch all of the fallen produce. This arm 5 may be scored to allow a single length to be manufactured which can be broken off by the user to adapt it to a desirable length. Furthermore, the angle of the step 9 and stake 8 with respect to the linear portion of the arm 5 can be so fabricated to accomodate the configuration of the plant.

The hooks 6 on the top-side of arm 5 are used to engage net 3 and fix it in place in a conical shape. A net 5 of uniform length and width dimensions may be used since any bunching of the net 5 as one progresses down towards the trunk or stem of the plant 2 will not hinder gathering of the produce.

Of course, one can tailor the net to avoid the bunching but this will only increase cost.

The arms 5 having holes 7 in their sides provide the openings necessary for insertion of the tying means 4 which maintain the conical structural integrity for promoting movement of the fallen produce to a single point for collection or to hold the produce in place where fallen for lessening the drop height of the produce thereby reducing or avoiding bruising.

Step 9 is so constructed to allow one to use the weight of one's body by stepping on the step 9 and thereby forcing stake 8 into the ground providing the required rigidity to the arm for stability of this net envelope. In addition, step 9 is so configured to allow easy placement of shield 10 thereon for support of the shield 10 and any fallen produce thereon. It should be noted that shield 10 may be fabricated of high strength PVC of an acceptable thickness, for example, 10–12 mil, to avoid being blown around by the wind when unburdened, yet flexible enough so that by separating the adjoining areas of slit 12 one can arrange the shield 10 around the stem or trunk. Shield 10 may have tab means as a portion of its periphery to allow bending under the step 9 for additional support where windy conditions are commonplace.

FIG. 3 illustrates the shield 10 in place (with the plant not shown) at the imaginary frustoconical plane of the assembled net 3, while FIG. 4 shows a top view of the shield 10 illustrating the center hole providing a place for the stem or trunk and the shield slit 12 allowing bending of the shield 10 for placement about the stem.

According to the preferred practice of the method of the invention, the arms 5 are set in the ground by placing them around the plant, for a typical application four arms would be required. The stakes 8 are forced into the ground by stepping on the steps 9. Tying means 4 are then threaded through holes 7 of arms 5 and both ends are tied to support the upper parts of arms 5 and for maintaining the inverted frustoconical shape of the net 3 which is placed on the hooks 6 of arms 5 to provide the surface to hold the produce in place where fallen or for urging the fallen produce to the shield 10. The inverted frustoconical shape of net 3 is pictured as arising from a plane across the wide top of the net, i.e., the base of a cone, and the plane of the shield, i.e., the frustrum, the part remaining after cutting-off the top portion of the cone parallel to the base. After placement of arms 5, tying means 4 and net 3, shield 10 is placed about the stem and pushed down to rest on steps 9. Collection of fallen produce is effected by either reaching in by hand for a low lying plant, or by releasing the upper portions of the net 3 to allow access to the fallen produce for taller plants such as trees, for example.

Today, in many home gardens dwarf fruit trees are now being grown in order to save space; these are ideally suited for the harvesting method of the present invention. While four arms 5 are usually adequate, for larger trees additional arms 5 may be necessary in order to insure that fruit from the scaffold, i.e., the main limbs branching from the trunk, is properly gathered.

Figure 5:
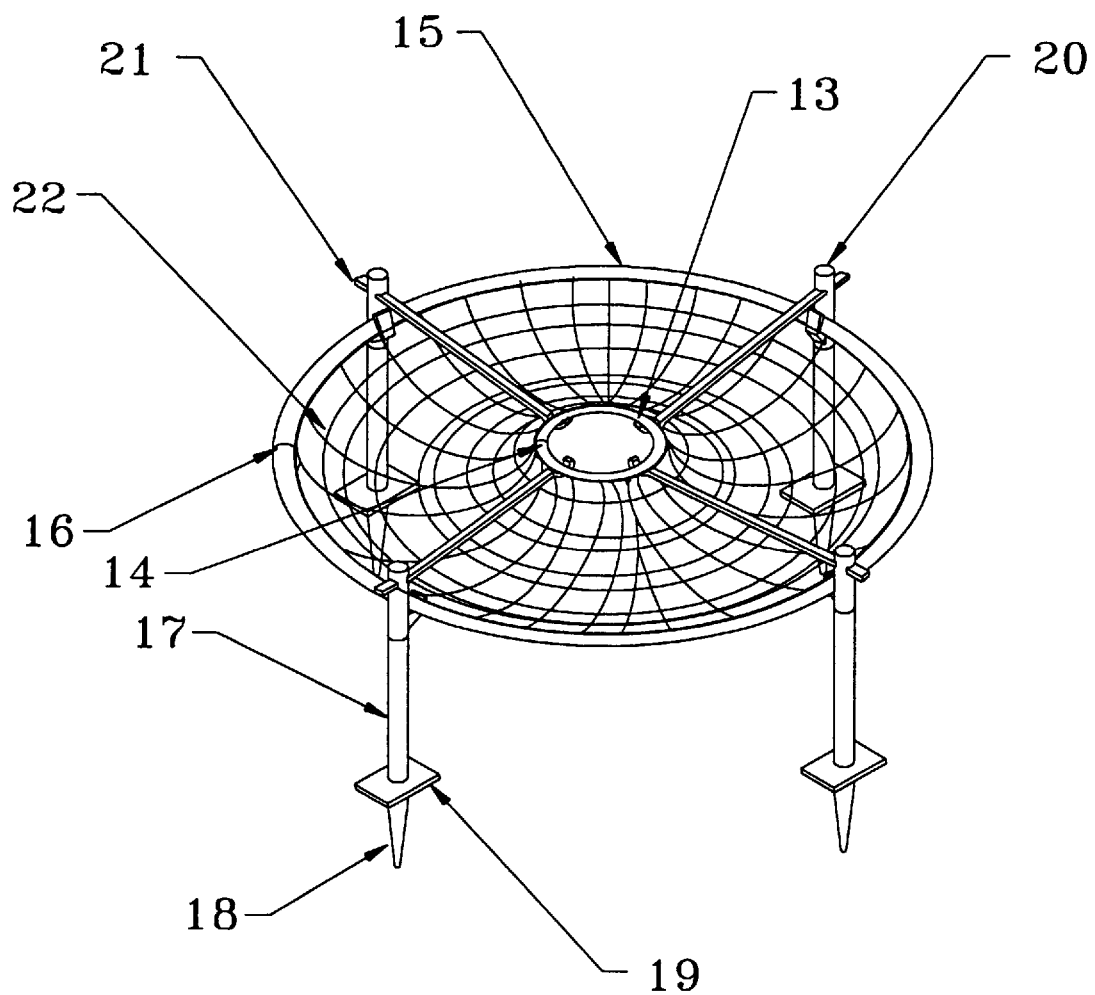
FIG. 5 is a perspective view of another embodiment of the invention.
Figure 6:
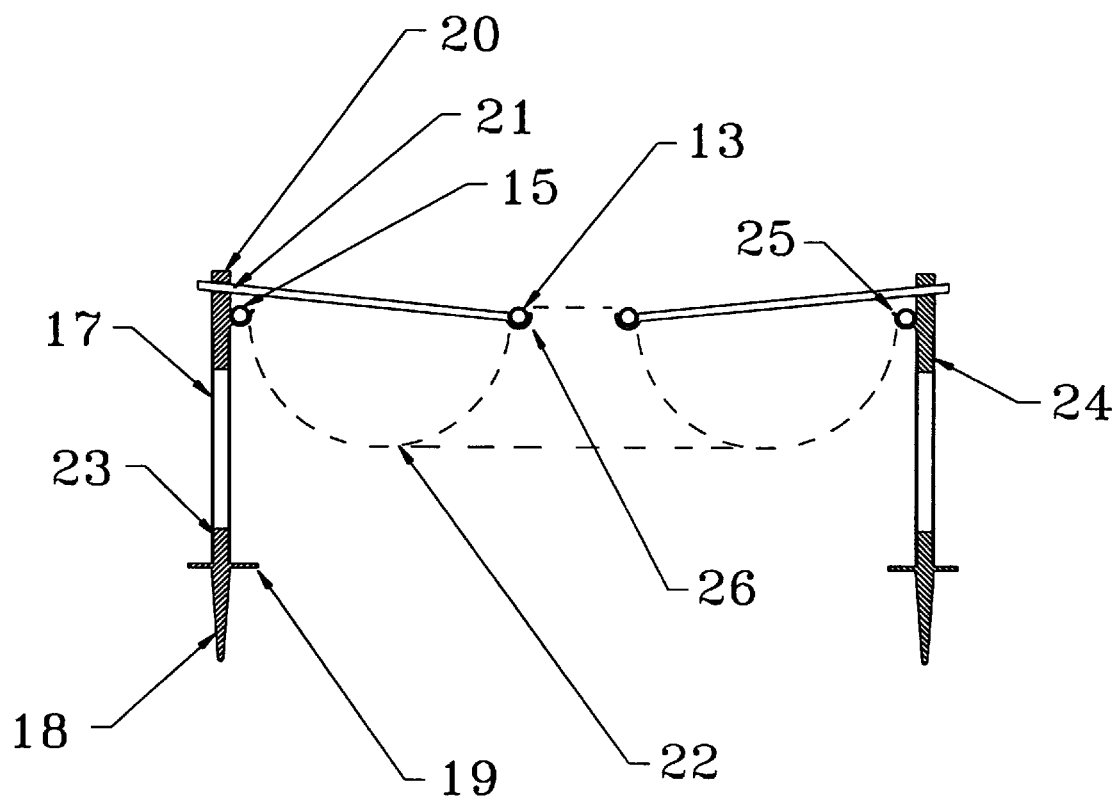
FIG. 6 is a side cross-sectional view of FIG. 5.

In a more expensive embodiment of the present invention as illustrated in FIGS. 5 and 6, a net 22 having loops (not shown) at its top and bottom, the loops thereof are threadingly engaged over an inner ring 13 having a splice point at 14 and an outer ring 15 having a splice point 16 and are next placed around a plant or tree (not shown) the splice points 14, 16 are engaged fixing the loops onto the rings 13,15. Once the above has been accomplished, the "splice points" can be butted together and joined ("spliced") by any suitable means.

A plurality of legs, four being a typical number, when assembled are driven into the ground to support the rings 13,15 and net 22. The legs consist of three members: an extension tube 17, a foot portion and a top portion, shown in more detail in FIGS. 9 and 7 respectively. The foot portion has an insert end 23 for insertion into a lower inner space of tube 17, a spike 18 to be driven into the ground, and a step 19 therebetween for stepping onto driving the spike into the ground. Of course, the step 19 portion could be driven by a hammer or the like if the ground is especially hard. Extension tube 17 may be of varying lengths to accomodate plants/trees of varying heights.

Figure 7:
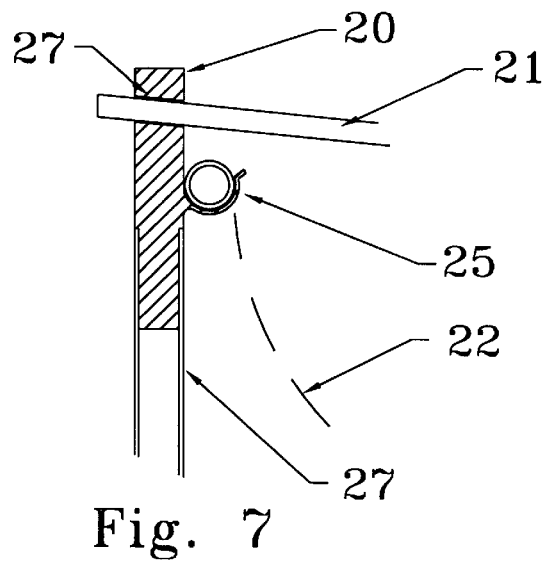
FIG. 7 is an upper detail side view of the top portion of FIG. 6.

The top portion has a post top 20, shown in more detail in FIG. 7, and an insert end 24 for insertion into an upper inner space of tube 17, top 20 having an aperture 27 therein for receiving an adjustment support means 21, adjustment support means 21 having a pocket 26 (FIG. 8) at its first end for supporting inner ring 13. The second end thereof is placed in the aperture 27 of post top 20 and can be slid therethrough to adjust the distance between the inner ring 13 and the outer ring 15 depending upon the size of the plant/tree and the desired spread of the net 22 to catch the fallen vegetables or fruit. The top portion also has an outer ring clip 25 for seating and supporting outer ring 15 when the device is assembled around the plant or tree.

In FIG. 7 is shown in cross section the detail of post top 20 and its insertion end 24 located in extension tube 17; also shown is aperture 27 with adjustment support means 21 in place, and outer ring 15 seated in outer ring clip 25.

Figure 8:
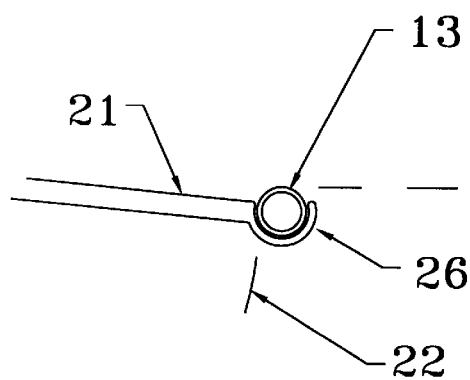
FIG. 8 is a detail view of the adjustment support means of FIG. 6.
Figure 9:
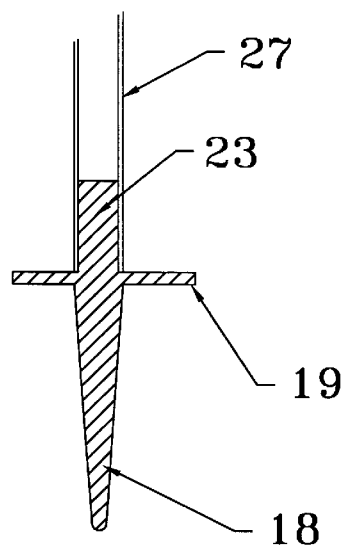
FIG. 9 is a lower detail side view of the foot portion of FIG. 6.

FIG. 8 illustrates inner ring 13 seated in adjustment support means pocket 26. FIG. 9 shows the foot portion with the insertion end 23 in extension tube 17 as well as step 19 and spike 18.

As mentioned above, this is a more expensive embodiment due to the number of elements requiring manufacture. The entire assembly can be fabricated from low cost UV protected polypropylene or other inexpensive plastic components.

The present invention avoids the complex systems of the prior art which systems include many elements of heavy materials designed for use in the very large commercial orchards. The set-up and handling of these prior art systems in general are quite labor and capital intensive. The effect of the present invention, on the other hand, is to provide a simple low cost system for increasing the yield of quality fruits and vegetables using few elements and which can be very easily stored and assembled in the home garden or small commercial farm or orchard.

Although the invention has been described and illustrated by way of specific embodiments, the method and products encompassed by the invention should be interpreted in keeping with the breadth of the claims set forth hereinafter.

What is claimed is:

1. A fruit and vegetable saver for harvesting with reduced spoilage by preventing produce of a plant from falling to the ground comprising:

a plurality of spaced apart angled supporting arms having hooks on the top side thereof, stakes at the bottom thereof and having holes therein as parts thereof;

a net for catching falling fruits and vegetables attached to said hooks of said supporting arms, a top of said net forming a long diameter circular base of an inverted imaginary cone when placed in position around a plant;

a tying means for insertion into said holes of said supporting arms for maintaining the cone-like shape of said net; and a shield means for insertion about said plant at the lower end of said net forming a short diameter circular cut-off at an imaginary frustoconical plane for preventing said fruits and vegetables from discharging from said saver.

2. The saver recited in claim 1 further comprising a step as part of said arm for applying a force to drive said arm into the ground, said step being at an angle to said arm and said stake to allow catching of all falling produce.

3. The saver recited in claim 1 wherein said arms are of high strength plastic to resist corrosion and weathering.

4. The saver recited in claim 1 wherein said arms are scored to allow a single length to be manufactured which can be broken off by the user to adapt it to a desirable length.

5. The saver recited in claim 1 wherein said net having sufficient openings to provide drainage and to be of sufficient strength and configuration to hold the produce in place where fallen and to allow urging the produce to said shield.

6. The saver recited in claim 1 wherein said tying means is a plastic rope.

7. The saver recited in claim 1 wherein said shield is of plastic having a circular periphery adequate to be supported by said step of said arm, having a hole in its center to accomodate a stem of said plant, and having a slit from said center hole to said periphery to allow bending of said shield for placement around the stem.

8. The saver recited in claim 1 wherein said shield has tab means as a portion of its periphery to allow bending under said step for additional support where windy conditions are commonplace.

9. A method for increasing yield of certain fruit and vegetable plants by reducing the incidence of spoilage comprising the steps of:

providing an angled arm-supported netting in an inverted cone-like shape, a top of said netting forming the base of said cone, positioned about said plant;

positioning tying means into said arm supports for maintaining said shape of said netting;

placing a shield means for insertion about said plant at a bottom of said netting forming an imaginary frustoconical plane for preventing said fruit and vegetable from discharging from said netting; and harvesting said fruit and vegetables when sufficient quantities have collected on said net and shield.

10. A fruit and vegetable saver for harvesting with reduced spoilage by preventing produce of a plant from falling to the ground comprising:

a plurality of spaced apart legs further comprising:
      a central extension tube;
      a top portion having a post top, having further an aperture therein for receiving an adjustment support means, an insert end for insertion into an upper space of the extension tube, and an outer ring clip for seating and supporting an outer ring;

a foot portion having an insert end for insertion into a lower space of the extension tube, a spike, and a step therebetween for stepping onto to drive the spike into the ground; and a pair of rings, an inner ring and the outer ring, having respectively splice points for receiving thereover loops of a net for catching fallen fruit and vegetables, for placement of the inner ring into a pocket formed at an inner end of the adjustment support means, and for placement of the outer ring in the outer ring clip of the top portion of said legs for supporting both rings for providing for a spread between the inner and the outer rings sufficient to catch falling fruit and vegetables.

11. The saver recited in claim 10 wherein the central extension tube is of varying lengths to accomodate plants and trees of varying heights.

12. The saver recited in claim 10 wherein the materials of construction are of high strength selected from the group consisting of plastics and metals.

* * * * *